Aug. 6, 1940.    J. KIRCH    2,210,208
PARTY LINE SYSTEM
Filed Dec. 12, 1938
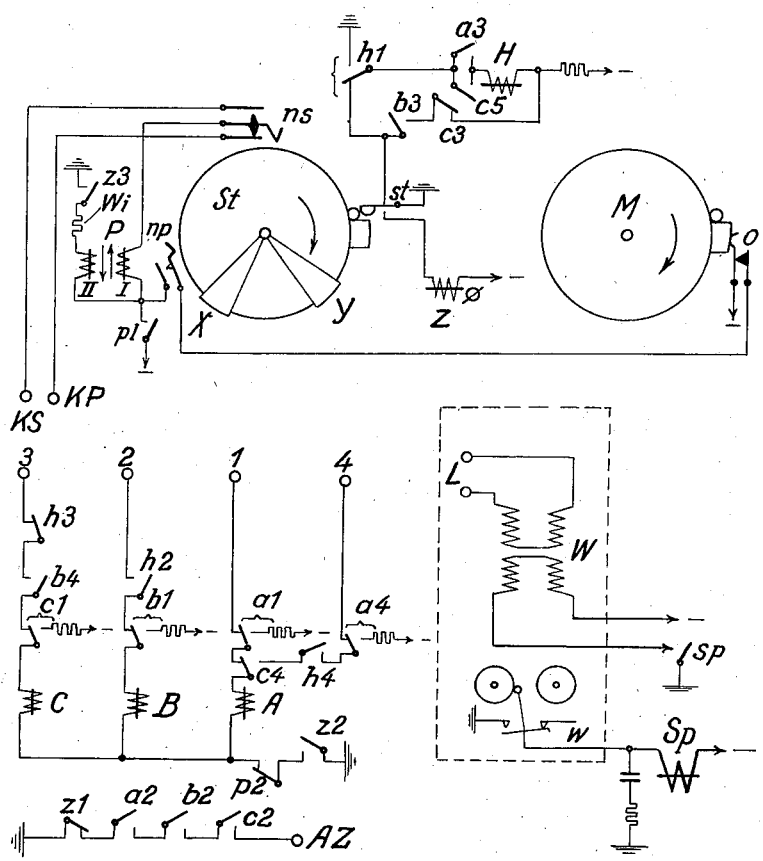
Inventor:
Josef Kirch Patented Aug. 6, 1940

2,210,208

UNITED STATES PATENT OFFICE 2,210,208

PARTY LINE SYSTEM

Josef Kirch, Berlin, Germany, assignor to Mix & Genest Aktiengesellschaft, Berlin-Schöneberg, Germany, a company Application December 12, 1938, Serial No. 245,259
In Germany December 11, 1937

8 Claims. (Cl. 179—28)

(Granted under the provisions of sec. 14, act of March 2, 1927; 357 O. G. 5)

The invention relates to arrangements of the kind in which branch telephone stations, connected to a line common to them, are called by means of ringing signals composed of signal elements of different lengths, as dots and dashes, and aims to create a particularly simple and reliable arrangement of this kind.

In accordance with the invention a setting device is provided which under the influence of each signal element makes a number of steps that accords with the length of the signal element, and which under the action of each such signal element returns into its position of rest. In addition, a switching device, preferably a relay chain, is provided which is by each signal element caused to perform one step or stage of its operation in order to ascertain whether the respective signal element still accords with the ringing code of the station.

Owing to the fact that a stepping device serves to distinguish between dots and dashes the reception of these signal elements will be substantially independent of their duration so that within certain limits the chief thing is the number of current impulses contained in the signal element. This is important especially in the case of systems having hand-generators for the production of impulses, because the speed of actuating these generators is of course subject to variation. Also it is of advantage that the relay chain or other switching device for testing the signal elements may be simple in construction since this device has not to store the signal elements but only has to test them as to their conformity with the ringing code of the station.

In the accompanying drawing, one embodiment of the invention is diagrammatically represented. Relays are denoted by capital letters while their contacts are designated by the respective small letters provided if necessary with discriminative indices.

$Sp$ denotes a stepping magnet that serves to drive a ratchet wheel $St$. With this wheel one or two cam discs, represented in the drawing by lugs $X$, $Y$, are united which when rotated into predetermined positions actuate dot contact $np$ and dash contact $ns$. The angles of rotation necessary to such end are so chosen as to correspond to the number of steps or teeth intended for the dot or the dash. After the reception of each signal element this stepping device returns to normal, and it does so under the influence of a flywheel M likewise driven by the magnet $Sp$. This flywheel during the reception of a signal element is pushed out of its position of rest and thereafter returns to normal under the action of a retractile spring not shown. A contact $o$ is thereby closed again, thus causing the received signal element to be tested as regards its conformity with the respective ringing code. Immediately thereafter the stepping device $St$, $X$, $Y$ is released, as by a leverage, for instance, whereby also this device is caused by a retractile spring to reassume its position of rest in order to be newly set by the next following signal element. Relays A, B, C constitute a relay chain which in cooperation with the test relay P and the wiring represented in the upper part of the drawing acts to test the signal element in the aforesaid respect.

The operation of this arrangement is as follows: Under the influence of the alternating current impulse constituting the first signal element an alternating current mechanism W, such as a ringing device, for instance, responds, thus switching its contact $w$, whereby the device $Sp$ receives impulses. Ratchet wheel $St$ and flywheel M are thereby rotated out of their resting position. After the first step of the wheel $St$ contact $st$ is switched, thus energizing the timing switch or relay Z. This device Z may be such for instance that the first impulse shall cause it immediately to assume its outmost working position and thereby to come under the influence of a braking device, such as a vane damper. Under the influence of means of this kind the device Z will not reassume its position of rest until a time has elapsed which is longer than the usual interval between two consecutive signal elements. The flywheel pushed out of its resting position at the same time opens its contact $o$.

Let us suppose the branch station here shown, which belongs to the party line L, to have the ringing signal .. – – allotted to it, and let it be assumed also that in the first place a dot has been emitted so that at the end of the first impulse series only contact $np$ is closed. The flywheel now returns into its position of rest and thereby closes its contacts $o$, thus completing the following circuit: —, $o$, $np$, PI, $ns$, terminal KP, terminal $I$, $a1$, A, $p2$, $z2$, + P II, W, $z3$, +.

In this circuit relay P does not respond because its two windings I, II are connected in opposition to each other. The first relay A of the relay chain however is energized and by switching its make-before-break contact $a1$ closes a locking circuit in order to remain energized. By closing contact $a2$ of relay A the circuit for the indicating device AZ is prepared in order to be completed later on. Contact $a3$ of relay A acts to prepare the circuit for an auxiliary relay H. This circuit is closed as soon as the ratchet wheel S*t* is released by flywheel M. Relay H responds over contact *st* while this is in its resting position and by means of its contact *h1* completes its holding circuit. Contact *h2* prepares the completion of the circuit for the next following relay B while contact *h3* prevents relay C from being energized.

It may be mentioned here that the contacts *np*, *ns* are in well known manner so constructed that they shall not be actuated by ratchet wheel S*t* when this is returning into its resting position. This is of importance in the case of a dash having been emitted because in this event contact *np* must be prevented from closing a circuit.

When receiving the next following or second signal element, mainly the same proceedings as just described will occur. However the relay which now responds is relay B which by means of its contact *b1* closes its locking circuit. Contact *b2* closes, thus preparing the completion of the circuit for the indicating device AZ. As soon as after the release of the ratchet wheel S*t* contact *st* returns to normal relay H is short-circuited over contacts *b3*, *c3*, whereby this relay is deenergized. By switching the contacts *h2*, *h3* the relay chain A, B, C is prepared for the operation of relay C.

The third element of the signal here concerned is a dash. The lugs X, Y hence act to switch both contacts *np*, *ns*. Therefore, in accordance with the ringing code of the station the circuit for relay C extends over the terminals KS and 3. Relay C closes its contact *c1* and thereby completes its holding circuit, and by switching its contact *c2* prepares the completion of the circuit for the indicating device AZ. Also, owing to relay C responding contact *c3* thereof interrupts the short-circuiting path allotted to relay H, while contact *c5* prepares the completion of the exciting circuit for relay H. By switching contact *c4* of relay C the locking circuit for relay A is interrupted. As a result, this relay is released and connected to terminal 4 in order to serve for the reception of the fourth signal element. This signal element acts to reenergize relay A over the terminals KS and 4. Relay A by switching its contact *a4* closes its locking circuit +, *z2*, A, *c4*, *h4*, *a4*, —.

Each time a signal element is received the timing relay Z is again energized by the switching of the contact *st*. Relay Z thus remains energized during the reception of a complete signal. Thereupon however owing to the longer pause which then occurs, relay Z is deenergized. In consequence of this, contact *z1* is closed, whereby the circuit for the indicating device AZ is completed. This device may be a ringing device or a glow lamp, for instance, but may be instead in the nature of a relay provided with a locking circuit that may be under the control of the switching hook of the station or may be controlled by other means thereof. By the continued deenergization of the device Z the contacts *z2*, *z3* thereof are opened, whereby the relays A, B, C are released. The entire arrangement then is in its normal state.

If any station receives a signal element which fails to accord with the ringing code thereof then the circuit over the respective relay of the relay chain is not established. Also, no current is then supplied to winding I of relay P. This relay hence responds over its winding II and by switching its contact *p1* closes its locking circuit *p1*, II, *z3*. Furthermore, contact *p2* is opened, thus interrupting the circuits of the relays A, B, C if any of these have been excited. Thereby also the prepared completion of the circuit for device Z is undone. The ensuing signal elements, it is true, are received by the switchgear, but will not be able to influence the relay chain. The circuit for relay P is not interrupted until the timing device Z returns to normal after reception of all the signal elements.

It will be suitable to limit the deflection of the flywheel in a manner that this wheel, no matter whether a dot or a dash is received, shall in each case take approximately the same time for returning to its position of rest. In lieu of such flywheel any other suitable retarding means may be provided. The use of a flywheel however has proved to be best.

In addition, means may be provided for testing the pauses between the signal elements. For instance, a contact of the timing switch Z may serve this purpose, that is, a contact which shall be opened immediately after the switch Z has left its outmost working position, thus having begun to return to normal, the reception of a signal element having been finished at that time. This contact may be controlled by a lug whose active face end is of a predetermined extent in order at the same time to determine the period during which after the end of the preceding reception of a signal element no impulses shall be conveyed to the stepping magnet S*p*.

The lugs X, Y are preferably of such extent at their face ends that the reception of the signals shall be a reliable operation even if they are not produced quite accurately, as may be the case, for instance, if the signals are given by means of a hand-generator.

What is claimed is:

1. A party-line telephone substation equipment of the type responsive to a desired code-ringing signal made up of a predetermined number of spaced trains of current fluctuations having approximately predetermined lengths respectively, which comprises a stepping device advanceable in step-by-step fashion in response to the individual fluctuations of each train of fluctuations, resetting means for restoring said stepping means to normal after each separate train, train counting equipment operable in step-by-step fashion for counting the separate trains of said code signal, and test means controlled by the positions of said stepping device and said train counting equipment for variably establishing a first or a second kind of circuit condition in dependance on whether the position of said device represents a train length in conformity or non-conformity respectively with the predetermined length of that train of said desired code which is represented by said train counting equipment.

2. A party-line telephone substation equipment of the type responsive to a desired code-ringing signal made up of a predetermined number of spaced trains of current fluctuations having approximately predetermined lengths respectively, which comprises a stepping device advanceable in step-by-step fashion in response to the individual fluctuations of each train of fluctuations, resetting means for restoring said stepping means to normal after each separate train, a relay counting chain operable in step-by-step fashion for counting the separate trains of said code signal, and test means controlled by the positions of said stepping device and said counting chain for variably establishing a first or second kind of circuit condition in dependence on whether the position of said device represents a train length in conformity or non-conformity respectively with the predetermined length of that train of said desired code which is represented by said counting chain.

3. A party-line telephone substation equipment of the type responsive to a desired code-ringing signal made up of a predetermined number of spaced trains of current fluctuations having approximately predetermined lengths respectively, which comprises a stepping device advanceable in step-by-step fashion in response to the individual fluctuations of each train of fluctuations, resetting means for restoring said stepping means to normal after each separate train, train counting equipment operable in step-by-step fashion for counting the separate trains of said code signal, test means controlled by the positions of said stepping device and said train counting equipment for variably establishing a first or a second kind of circuit condition in dependance on whether the position of said device represents a train length in conformity or non-conformity respectively with the predetermined length of that train of said desired code which is represented by said train counting equipment, and switching means responsive to the establishment of said second kind of circuit condition to disable said counting chain.

4. A substation equipment according to claim 3, wherein said first kind of circuit condition comprises a conductive path extending through a relay of said counting chain and further comprising a test relay, and means for causing the operation of said test relay responsive to the termination of a train of fluctuations only if such conductive path is not established.

5. A substation equipment according to claim 3, wherein said switching means comprise a test relay operative in response to the establishment of said second kind of circuit condition, and means for maintaining said relay energized until the termination of the received code-ringing signal.

6. A substation equipment according to claim 3, further comprising supervisory means for responding to the end of a signal reception, and means for giving a calling signal jointly responsive to the condition of said supervisory means and said counting chain.

7. A substation equipment according to claim 3, further comprising a timing device for responding to the continued absence during more than a predetermined time of signal trains, and means for giving a calling signal jointly responsive to the condition of said timing device and said counting chain.

8. A substation equipment according to claim 2, further comprising means responsive to the establishment of said second kind of circuit condition to release all energized relays of said counting chain.

JOSEF KIRCH.